United States Patent Office 2,875,246
Patented Feb. 24, 1959

2,875,246
(2-PROPYL-4-PENTENOYL) UREA

Harold G. Kolloff and Patrick H. Seay, Kalamazoo, Mich., assignors to The Upjohn Company, Kalamazoo, Mich., a corporation of Michigan No Drawing. Application November 12, 1957
Serial No. 695,541

1 Claim. (Cl. 260—553)

The present invention relates to a new compound (2-propyl-4-pentenoyl)urea, useful as a tranquilizer and sedative.

The compound of this invention has advantage in that it does not possess undesirable hypnotic activity. An isomer, (2-isopropyl-4-pentenoyl)urea, when given intraperitoneally in mice at 300 milligrams per kilogram induced sleep for six hours, whereas the compound of this invention did not, giving only depression at 300 milligrams per kilogram. This is a surprising result in view of the fact that the compound of this invention gave significantly greater potentiation of hexobarbital-induced sleep as shown in the following table, the sleep potentiation values and the $LD_{50}$ values being determined intraperitoneally in mice.

POTENTIATION OF HEXOBARBITAL-INDUCED SLEEP

| Compound | $LD_{50}$, mg./kg. | Percent increase in sleeptime at the following percentages of $LD_{50}$ | | |
|---|---|---|---|---|
| | | 20 | 10 | 5 |
| (2-propyl-4-pentenoyl)urea | 650 | 2,700 | 683 | 801 |
| (2-isopropyl-4-pentenoyl)urea | 650 | 825 | 279 | 183 |

The data given in the table show that (2-propyl-4-pentenoyl)urea gives a disproportionate and unexpected increase in hexobarbital-induced sleeping time that could not have been predicted from the activity of the prior art compound.

The new compound of this invention can be combined with solid or liquid pharmaceutical carriers and formulated into the form of tablets, powder packets, or capsules, or dissolved or suspended in suitable solvents for oral or parenteral administration.

The novel compound of the invention can be prepared by any of the known processes for acylating urea. Ordinarily simply reacting urea with a 2-propyl-4-pentenoyl acylating agent such as the free acid, the acid anhydride, acid halide, or the like will suffice.

It is of advantage to react 2-propyl-4-pentenoyl halide with an excess of urea in an inert solvent such as benzene, toluene, ethers, hexane, inert halogenated hydrocarbons, and the like. Particularly good yields and economy are obtained with from two to 2½ moles of urea for each mole of 2-propyl-4-pentenoyl halide. Any greater or lesser amount can be used, however, without changing the identity of the product.

A preferred method is to treat 2-propyl-4-pentenoic acid with an excess of thionyl chloride and add the acid chloride formed without further purification (other than mere removal of excess thionyl chloride) to an excess of urea in benzene at reflux temperature.

The following example is illustrative of the production of the compound of the present invention, but is not to be construed as limiting.

EXAMPLE
Preparation of (2-propyl-4-pentenoyl)urea

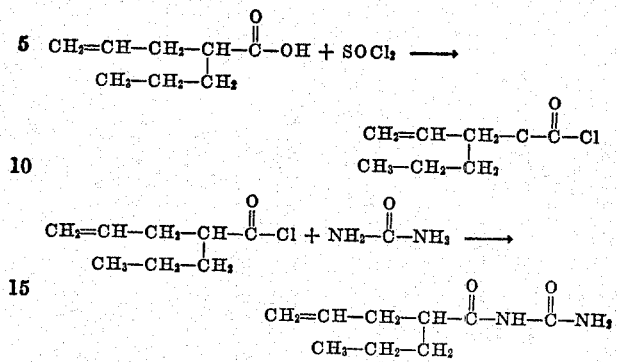

A mixture of 1.8 kilograms (fifteen moles) of thionyl chloride and 1.42 kilograms (ten moles) of 2-propyl-4-pentenoic acid [Hjelt, Ber. 29, 1855 (1896)] in a 5-liter flask, fitted with a reflux condenser and stirrer, was allowed to react until evolution of gas stopped; the temperature did not rise above 78 degrees centigrade. It was then heated under reflux for one hour. At the end of the reflux period the excess thionyl chloride was removed by distillation under reduced pressure through a fractionating column. The 2-propyl-4-pentenoyl chloride thus obtained was used without further purification.

In a twelve-liter flask, fitted with a stirrer, condenser and dropping funnel, were placed 1.5 kilograms (25 moles) of urea and three liters of benzene. About one liter of benzene was distilled to remove water and then the above crude acid chloride was added with stirring at reflux during a period of 25 minutes. The heat of reaction was sufficient to maintain reflux. When the reaction subsided, the solution was heated under reflux with stirring for four hours; solids separated from solution during reflux and one liter more of benzene was added to form a thinner slurry and facilitate stirring. The mixture was cooled to room temperature and the solids removed by filtration. The solids were washed well with aqueous sodium bicarbonate solution, then with water, and dried in a vacuum oven at sixty degrees centigrade, giving 1.54 kilograms (83.7 percent of theory) of (2-propyl-4-pentenoyl)urea as light tan crystals melting at 175–176 degrees centigrade. On recrystallization from ethanol, there was obtained 1.26 kilograms of nearly white crystals melting at 178–178.5 degrees centigrade.

Analysis.—Calculated for $C_9H_{16}N_2O_2$: C, 58.65; H, 8.76; N, 15.21. Found: C, 58.80; H, 8.89; N, 15.27.

It is to be understood that the invention is not to be limited to the exact details shown and described, as obvious modifications and equivalents will be apparent to one skilled in the art, and the invention is therefore to be limited only by the scope of the appended claim.

We claim:
(2-propyl-4-pentenoyl)urea.

References Cited in the file of this patent
UNITED STATES PATENTS

| | | |
|---|---|---|
| 1,633,392 | Boedecker | June 21, 1927 |
| 1,969,828 | Volwiler et al. | Aug. 14, 1934 |
| 2,713,066 | Adelson et al. | July 12, 1955 |

OTHER REFERENCES

Jurgen: Arch. Exptl. Path. Pharmokol., vol. 212, pp. 440–55 (1951), (listed as Nauyn-Schmiedeberg's Archiv., etc.).

Spielman et al.: J. A. C. S., vol. 70, pp. 4189–4191, (1948).